(12) United States Patent
Gothait

(10) Patent No.: US 6,850,334 B1
(45) Date of Patent: Feb. 1, 2005

(54) SYSTEM AND METHOD FOR THREE DIMENSIONAL MODEL PRINTING

(75) Inventor: Hanan Gothait, Rehovot (IL)

(73) Assignee: Objet Geometries LTD, Rehovot (IL)

(*) Notice: Subject to any disclaimer, the term of this patent is extended or adjusted under 35 U.S.C. 154(b) by 0 days.

(21) Appl. No.: 09/484,272

(22) Filed: Jan. 18, 2000

(51) Int. Cl.[7] .................. G06F 15/00; G06F 19/00
(52) U.S. Cl. ................. 358/1.1; 358/1.2; 700/118; 700/119; 700/98
(58) Field of Search ................. 358/1.1, 1.2, 1.4; 700/119, 118, 98; 364/468.27; 264/40.1, 308

(56) References Cited

U.S. PATENT DOCUMENTS

| | | |
|---|---|---|
| 4,575,330 A | 3/1986 | Hull |
| 5,053,090 A | 10/1991 | Beaman et al. |
| 5,136,515 A | 8/1992 | Helinski ............... 700/119 |
| 5,204,055 A | 4/1993 | Sachs et al. |
| 5,252,264 A | 10/1993 | Forderhase et al. |
| 5,287,435 A * | 2/1994 | Cohen et al. ............ 345/418 |
| 5,340,433 A | 8/1994 | Crump |
| 5,340,656 A | 8/1994 | Sachs et al. |
| 5,387,380 A | 2/1995 | Cima et al. |
| 5,519,816 A | 5/1996 | Pomerantz et al. |
| 5,594,652 A | 1/1997 | Penn et al. |
| 5,717,599 A | 2/1998 | Menhennett et al. |
| 5,740,051 A | 4/1998 | Sanders, Jr. et al. |
| 5,784,279 A | 7/1998 | Barlage, III et al. |
| 5,879,489 A | 3/1999 | Burns et al. |
| 5,902,537 A * | 5/1999 | Almquist et al. ......... 264/401 |
| 5,943,235 A | 8/1999 | Earl et al. ............... 700/98 |
| 6,030,199 A | 2/2000 | Tseng |
| 6,136,252 A | 10/2000 | Bedal et al. ............ 264/308 |
| 6,165,406 A | 12/2000 | Jang et al. |
| 6,193,923 B1 | 2/2001 | Leyden et al. ........... 264/401 |
| 6,259,962 B1 * | 7/2001 | Gothait ................. 700/119 |
| 6,401,002 B1 * | 6/2002 | Jang et al. .............. 700/119 |
| 6,490,496 B1 | 12/2002 | Dacey .................. 700/118 |
| 6,508,971 B2 | 1/2003 | Leyden et al. ........... 264/101 |
| 6,532,394 B1 | 3/2003 | Earl et al. .............. 700/119 |
| 6,658,314 B1 | 12/2003 | Gothait ................. 700/119 |
| 2002/0011693 A1 | 1/2002 | Leyden et al. ........... 264/401 |

FOREIGN PATENT DOCUMENTS

| | | |
|---|---|---|
| EP | 0 852 536 | 9/2002 |
| WO | WO 97/31781 | 9/1997 |
| WO | WO 98/41385 | 9/1998 |

OTHER PUBLICATIONS

International Preliminary Examination Report of International Application No. PCT/IL01/00043, dated May 30, 2002.

Z Corporation, News Release, "Z Corp. Debuts Robust New Materials System", Apr. 2, 1998.

* cited by examiner

*Primary Examiner*—Twyler Lamb
(74) *Attorney, Agent, or Firm*—Eitan, Pearl, Latzer & Cohen Zedek, LLP

(57) ABSTRACT

A system and a method for printing of three-dimensional models and apparatus for controlling the height and thickness of the layers of interface material forming the 3-D models being printed, is provided. The method includes the steps of dispensing a pre-determined quantity of interface material from at least one printing head to form at least one interface layer; leveling the dispensed interface material to a pre-determined height; curing the leveled interface material; and repeating the steps of dispensing, leveling and curing thereby producing a plurality of interface layers to a configured pattern layer for forming the three-dimensional model.

22 Claims, 2 Drawing Sheets

SYSTEM AND METHOD FOR THREE DIMENSIONAL MODEL PRINTING

FIELD OF THE INVENTION

This present invention relates to three-dimensional (3-D) modeling in general and to a system and a method for controlling the height and thickness of printed layers, in particular.

BACKGROUND OF THE INVENTION

3-D printing, which works by building parts in layers, is a process used for the building up of 3-D models. 3-D printing is relatively speedy and flexible allowing for the production of prototype parts and tooling directly from a CAD model, for example.

Using 3-D printing enables the manufacturer to obtain a full 3-D model of any proposed product before tooling thereby possibly substantially reducing the cost of tooling and leading to a better synchronization between design and manufacturing. A lower product cost and improved product quality can also be obtained.

Various systems have been developed for computerized 3-D printing. Known systems include a system developed by 3-D Systems Inc. of California, USA. which operates on the basis of stereo-lithography wherein a focused ultra-violet laser is scanned over the top of a bath of photopolymerizable liquid polymer plastic material. The surface of the bath is polymerized on contact with the UV laser creating a solid plastic layer at or just below the surface U.S. Pat. No. 5,387,380 to Cima et al. describes a technique for providing layered parts by depositing a layer of powder material and then depositing a binder material in selected regions to produce a layer of bonded powder material at the selected regions. These steps are repeated for successive layers to form a desired component. Following heat treatment, unbound powder is removed, leaving the fabricated part.

U.S. Pat. No. 5,287,435 to Cohen et al describes apparatus for producing 3-D models which includes apparatus for depositing layer-by-layer, a photopolymer material in a selectable configuration and apparatus for curing each layer prior to deposition of the succeeding layer.

A disadvantage of this system is that it is difficult to achieve a flat uniform surface for each layer. U.S. Pat. No. 5,287,435 utilizes a machining unit for trimming the surface of each layer to remove excessive thickness.

In standard two-dimensional printing, the ink jet printer prints parallel ink. dot lines on a substrate by displacing its print head relative to a substrate in one direction during the actuation of its ink jet heads.

In U.S. patent application Ser. No. 09/259,323 to the Assignees of the present application, and incorporated herein by reference, there is described an apparatus and a method for 3-D model printing. U.S. patent application Ser. No. 09/259,323, now issued as U.S. Pat. No. 6,259,962, describes apparatus including a printing head having a plurality of nozzles, a dispenser connected to the printing head for selectively dispensing interface material in layers and curing apparatus for optionally curing each of the layers deposited. The depth of each deposited layer is controllable by selectively adjusting the output from each of the plurality of nozzles.

In U.S. patent application Ser. No. 09/412,618 to the Assignees of the present application, and incorporated herein by reference, there is described an apparatus and a method for 3-D model printing. U.S. patent application Ser. No. 09/412,618 describes a system and a method for printing complex 3-D models by using interface material having different hardness or elasticity and mixing the interface material from each of the printing heads to control the hardness of the material forming the 3-D model.

SUMMARY OF THE INVENTION

The present invention provides a system and a method for printing of three-dimensional models and for controlling the height and thickness of the layers of interface material forming the 3-D models being printed.

There is thus provided, in accordance with a preferred embodiment of the present invention, a method for printing of a three-dimensional model. The method includes the steps of:

dispensing a pre-determined quantity of interface material from at least one printing head to form at least one interface layer;

leveling the dispensed interface material to a pre-determined height;

curing the leveled interface material; and repeating the steps of dispensing, leveling and curing thereby producing a plurality of interface layers to a configured pattern layer for forming the three-dimensional model.

Furthermore, in accordance with a preferred embodiment of the present invention, the interface material includes first and second interface material dispensed from first and second printing heads, respectively.

In addition, in accordance with a preferred embodiment of the present invention, the method further includes the steps of:

curing the first interface material for a first period of time and at a first radiation wavelength; and curing the second interface material for a second period of time and at a second radiation wavelength.

Furthermore, in accordance with a preferred embodiment of the present invention, the step of leveling includes the step of removing surplus material from each layer of dispensed interface material utilizing a roller. The step of leveling further includes the steps of cleaning and curing the surplus material off the roller.

Additionally, there is also provided, in accordance with a preferred embodiment of the present invention, a system for three-dimensional printing of a three-dimensional model, The system includes at least one printing head for dispensing a pre-determined quantity of interface material to form at least one interface layer, leveling apparatus for removing surplus material from the at least one interface layer prior to curing, curing apparatus for curing the leveled interface layer, and a controller connected to the leveling apparatus for controlling the height of each of the at least one interface layer.

Furthermore, in accordance with a preferred embodiment of the present invention, the printing head includes first and second printing heads for dispensing first and second interface materials respectively from first and second dispenser connected thereto respectively.

Furthermore, in accordance with a preferred embodiment of the present invention, the curing apparatus includes a first curing apparatus for curing the first interface material for a first period of time and at a first radiation wavelength; and a second curing apparatus for curing the second interface material for a second period of time and at a second radiation wavelength.

Furthermore, in accordance with a preferred embodiment of the present invention, the interface layer is a photopolymer material curable by the application of ultra-violet or infra-red radiation.

In addition, in accordance with a preferred embodiment of the present invention, the leveling apparatus includes a roller rotatable about a longitudinal axis, the roller being operative to make contact with the at least one interface layer; and a sensing device embedded within the roller operative to detect the contact of the roller with the interface layers.

Furthermore, in accordance with a preferred embodiment of the present invention, the system further includes cleaning apparatus connected to the controller for cleaning the leveling apparatus and waste disposal apparatus for disposing of the waste interface material. The waste disposal apparatus includes curing apparatus using ultra-violet or infra-red radiation.

Furthermore, in accordance with a preferred embodiment of the present invention, the outer circumferential surface of the roller includes grinding material.

Additionally, there is also provided, in accordance with a preferred embodiment of the present invention, apparatus for controlling the finished height of interface layers deposited during the printing of a three-dimensional model. The apparatus includes a roller rotatable about a longitudinal axis, the roller being operative to make contact with the deposited interface layers, a sensing device embedded within the roller operative to detect the contact of the roller with the interface layers, and a processor for processing the output from the sensing device. The output from the sensing device is indicative of the height and width of interface material protruding above a pre-determined level.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
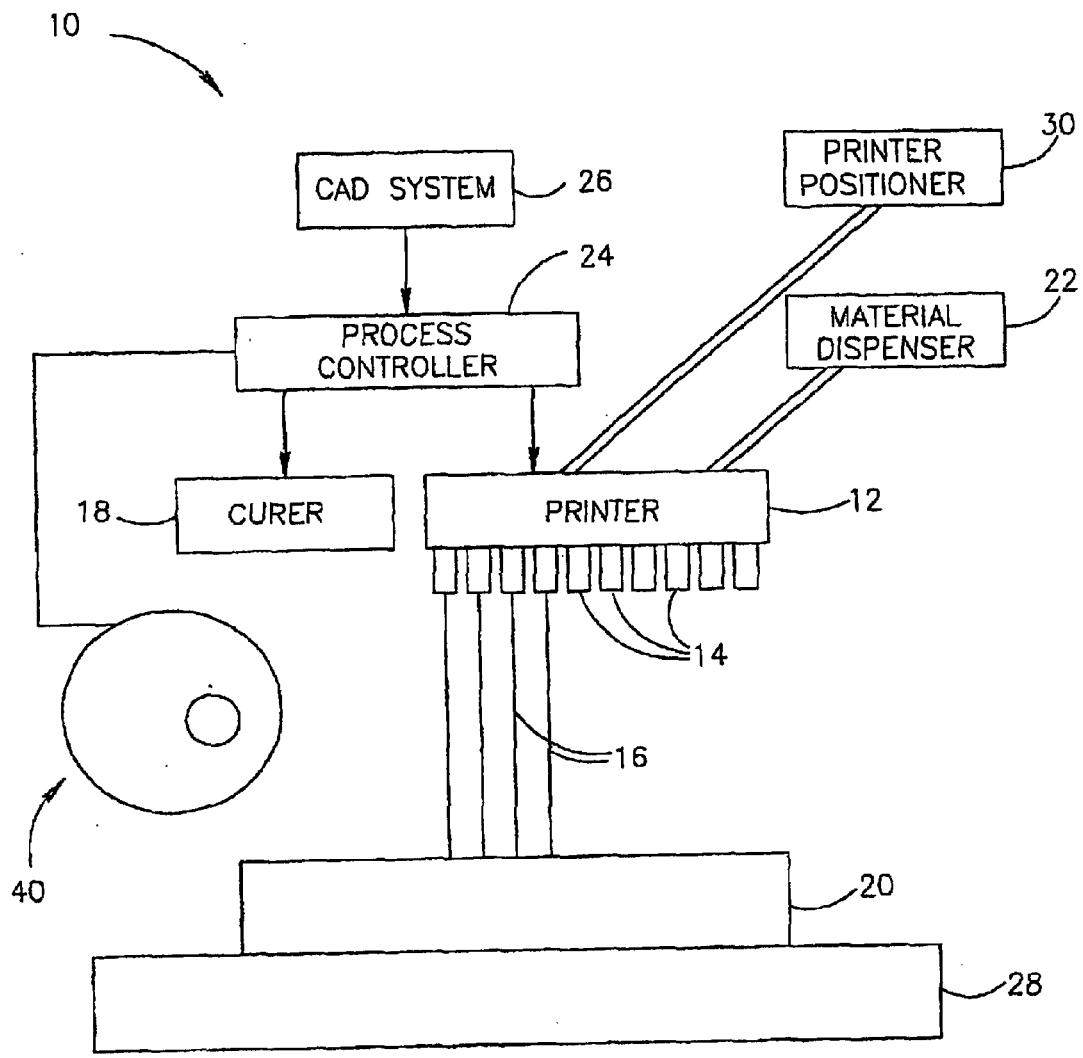
FIG. 1 is a schematic illustration of a 3-D printing system, constructed and operative in accordance with a preferred embodiment of the present invention.

Reference is made to FIG. 1, which is a schematic illustration of a 3-D printing system, generally designated 10, constructed and operative in accordance with a preferred embodiment of the present invention. The 3-D printing system 10 is similar to the 3-D printing system described in U.S. patent application Ser. No. 09/259,323, now issued as U.S. Pat. No. 6,259,962, assigned to the Assignees of the present application and incorporated herein by reference.

The 3-D printing system 10 comprises a printing head 12 having a plurality of ink-jet nozzles 14, through which interface material 16 is jetted and a curing unit 18 for curing the interface material 16 to form the 3-D component, referenced 20, being designed. The interface material 16 is preferably a photopolymer, containing ultra violet (UV) or infra-red (1R) curable material. For example, material based on reactive acrylates is suitable for UV curing or hardening by the application of UV radiation from curing unit 18. The 3-b component 20 is build up in layers, the depth of each layer being controllable by selectively adjusting the output from each of the plurality of ink-jet nozzles 14.

The 3-D printing system 10 further comprises a dispenser 22, a process controller 24 and a Computer Aided Design (CAD) system 26. The process controller 24 is coupled to CAD system 26, curing unit 18 and printing head 12.

The dispenser 22, which contains interface material 16, is suitably connected to printing head 12. The 3-D component 20 is formed on a support surface 28, which can be optionally positioned in the Z- and Y- axes by positioning apparatus 30.

The 3-D printing system 10 further comprises a height control and sensing apparatus generally referenced 40, which is coupled to the process controller 24.

Figure 2:
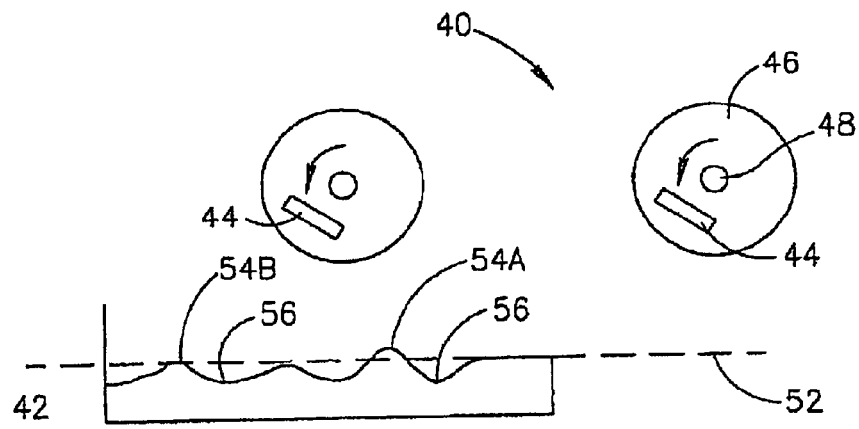
FIG. 2 is a schematic elevational view of the height control and sensing apparatus usuable with the printing system of FIG. 1.

Reference is now made to FIG. 2 which is a schematic elevational view of the height control and sensing apparatus 40 Also shown is an exaggerated enlarged detail of an interface layer 42.

Height control and sensing apparatus 40 comprises a, roller 46, rotatable about a longitudinal axis 48, and a sensing device 44, embedded within the roller 46. The roller 46 is connected to a suitable motor (not shown), such as a stepper or DC motor, and coupled to the process controller 24. The roller 46 is operative to make contact with the interface layer 42 and to remove surplus material from a layer. The roller 46 may be set to any pre-determined level so as to remove up to a specific amount of surplus interface material.

In an exemplary embodiment, each interface layer 42 is approximately 25$\mu$ thick and the roller 46 is set to remove up to 10$\mu$. Preferably, the sequence of model building includes the building-up of three layers, followed by cleaning of the topmost layer using the roller 46 and then curing. The roller 46 is cleaned by any suitable device such as a knife (not shown) known in the art and the waste material is disposed of.

The cleaning apparatus may comprise any suitable apparatus such as a cleaning roller or brushes connected to the process controller 24, cleaning fluid dispenser and waste disposal apparatus. Preferably, the cleaning roller or brushes are coated with cleaning fluid and cleaning takes place after removal of any protrusions and before the application of the subsequent interface layer 42.

UV or IR curing converts the photopolymer chemical material into a solid and thus effectively neutralizes the properties of the photopolymer. Thus, any residue material attached to the roller 46 and cleaning knife can also be neutralized by curing. Thus, it will be appreciated that as a by-product of the printing system 10, UV or IR curing can be used a environmentally safe system for neutralizing waste photopolymer material.

The sensing device 44 is operative to detect the contact of the roller 46 with the interface layer 42. In a preferred embodiment, the sensing device 44 is configured to audibly indicate the roller's contact with the interface material. As the roller 46 makes contact with a peak, the sensing device 44 indicates the presence of the peak or protrusion by a 'louder' sound due to the roller's longer contact with the interface layer 42. An absence of material (such as the trough 56) is indicated by the lack of any sound emitted by the sensing device 44. The 'contact' (or lack of contact) is continuously processed by the process controller 24 thereby to determine the contour of the interface layer 42.

The desired finished level of the interface layer 42 is shown by the dashed line, reference 52. It will be appreciated that the reference to interface layer 42 is not restricted to a single layer but may be comprise one or more layers (such as three layers in the example above). A single layer is shown in interface layer 42 for clarity.

In practice, the interface layer 42 does not have a consistent thickness along its entire length and may comprise a plurality of peaks (or ripples) 54 and troughs 56. In the example, peaks, (referenced 54) are approximately level with reference line 52. Peaks projecting above line 52 are referenced by suffix, for example 54A and 54B.

Thus, as the roller 46 passes and makes contact with the interface layer 42, the sound emitted changes, the peak 54A emitting a 'louder' sound than peak 54B and peak 54B emitting a 'louder' sound than peak 54C while the troughs 56 are indicated by the absence of a sound.

In an alternative preferred embodiment, the outer circumferential surface of the roller 46 comprises carborundum or other grinding material suitable for trimming the surface of the interface layer 42 to remove excessive thickness.

For the purposes of clarity, the height control and sensing apparatus 40 is shown some distance above the interface layer 42. It will be appreciated that the height control and sensing apparatus 40 may be adjusted to any position in accordance with the 3-D model being printed.

Figure 3A:
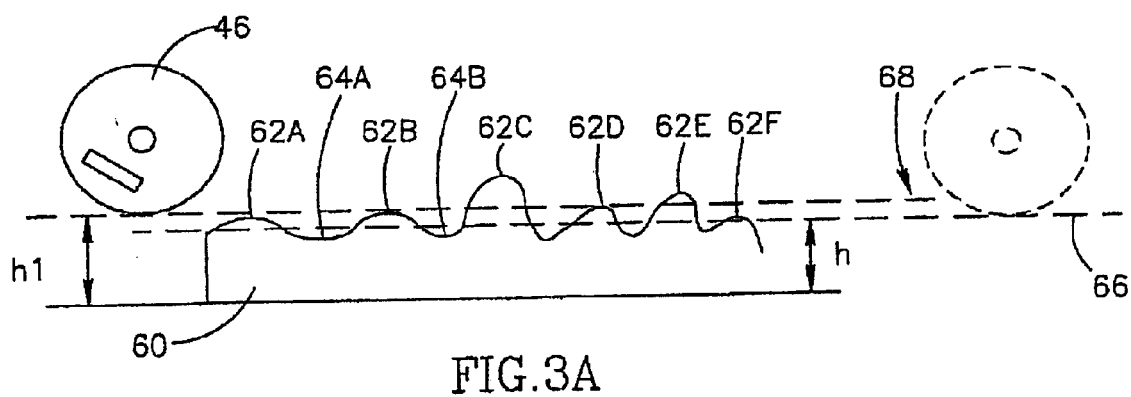
FIG. 3A is a schematic illustration of an interface layer.
Figure 3B:
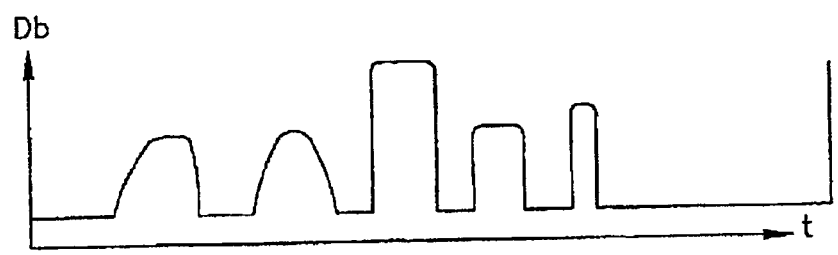
FIG. 3B is a graphical representation of the sound picked up by the height control and sensing apparatus of FIG. 2.

Reference is now made to FIGS. 3A and 3B to illustrate the use of the height control and sensing apparatus 40 for controlling the finished height (or depth) of an interface layer, referenced 60, schematically illustrated in FIG. 3A.

In the example, there are a plurality of peaks, referenced 62a, 62b. 62f and a plurality of troughs 64a, 64b, etc. FIG. 3B is a graphical representation of the sound level as the roller 46 makes contact with the interface layer 60. The vertical axis represents the intensity level (Db) of the sound and the horizontal axis represents the time. The height of the peak correlates with the Db level recorded and the time period at a particular Db level correlates with the width of the peak. Thus, it is possible to determine the parameters, of interface layer 60, such as the amplitude, height and width of the peaks can also be determined to obtain a profile of the interface layer 60.

In the example of FIG. 3A, peaks 62a, 62b and 62d are approximately the same level (reference line 66) while peaks 62c and 62e project above reference line 68. As the roller 46 passes over interface layer 60, the process controller 24 will receive input from the sensing device 44 indicating a plurality of peaks, of which peak 62c will stand out. The process controller 24 is programmable to determine the cross-sectional elevation of the interface layer 60 from the sound signals received and thus determine the height of each of the peaks.

The programmed algorithm then determines the level to which roller 46 is to be lowered. Thus, for example, if protrusions below a pre-determined level are acceptable, the roller 46 may not be used to remove these protrusions for this interface layer 60. In the example of FIG. 3B, if the protrusions below height h1 are acceptable, only peaks 62c and 62E need to be ground down. In this case, the roller 46 (dashed outline) is lowered to reference level 68.

Alternatively, if height h and also the number of protrusions N (say, where n>3) is are the determining factors, roller 46 is lowered to reference level 66 to remove the plurality of protrusions.

It will be further appreciated that the present invention is not limited by what has been described hereinabove and that numerous modifications, all of which fall within the scope of the present invention, exist. Rather the scope of the invention is defined by the claims, which follow:

What is claimed is:

1. A method for printing of a three-dimensional model, said method comprising the steps of:

dispensing a pre-determined quantity of interface material from at least one printing head to form at least one interface layer of photopolymer material including first and second interface material;

leveling the layer of photopolymer material including said first and second interface materials using a roller rotatable about an axis, the roller including a sensing device embedded within the roller operative to detect the contact of the roller with the interface materials;

curing the leveled photopolymer material including first and second interface materials; and repeating said steps of dispensing, leveling and curing thereby producing a plurality of said at least one interface layer of photopolymer material to a configured pattern layer for forming the three-dimensional model.

2. The method according to claim 1, wherein said first and second interface materials are dispensed from first and second printing heads, respectively.

3. The method according to claim 2, further comprising the steps of:

curing said first interface material for a first period of time and at a first radiation wavelength; and curing said second interface material for a second period of time and at a second radiation wavelength.

4. The method according to claim 1, wherein said step of leveling comprises the step of:

removing surplus material from a layer of dispensed photopolymer material utilizing the roller, such that the dispensed layer is leveled to a pre-determined height.

5. The method according to claim 4, wherein said step of leveling further comprises the step of:

cleaning the surplus material off said roller.

6. The method according to claim 5, wherein said step of leveling further comprises the step of:

curing the surplus material.

7. The method of claim 1, comprising providing an audible signal to indicate contact with an interface material.

8. A system for three-dimensional printing of a three-dimensional model, comprising:

at least one printing head for dispensing a pre-determined quantity of interface material to form at least one interface layer of photopolymer material including first and second interface material;

a leveling apparatus for removing surplus material from said at least one interface layer prior to curing, said leveling apparatus including at least a roller rotatable about an axis, the roller including a sensing device embedded within the roller operative to detect the contact of the roller with the interface materials;

a curing apparatus for curing the leveled interface layer; and a controller connected to said leveling apparatus for controlling the height of each of said at least one interface layer.

9. The system according to claim 8 wherein said at least one printing head comprises first and second printing heads for dispensing firs t a nd second interface materials respectively from first and second dispenser connected thereto respectively.

10. The system according to claim 9 wherein said cu ring apparatus comprises:
- a first cur ing apparatus for curing said first interface material for a first period of time and at a first radiation wavelength; and
- a second curing apparatus for curing said second interface material for a second period of time and at a second radiation wavelength.

11. The system according to claim 8, wherein said interface layer is a photopolymer material curable by the application of ultra-violet or infra-red radiation.

12. The system according to claim 8, wherein said roller is rotatable about a longitudinal axis.

13. The system according to claim 8, and further comprising:
- cleaning apparatus connected to said controller for cleaning said leveling apparatus; and
- waste disposal apparatus for disposing of the waste interface material.

14. The system according to claim 13, wherein said waste disposal apparatus comprises curing apparatus using ultra-violet or infra-red radiation.

15. The system according to claim 12, wherein the outer circumferential surface of said roller comprises grinding material.

16. The system of claim 8, comprising a device to provide a signal to audibly indicate contact with an interface material.

17. Apparatus for controlling the finished height of interface layers deposited during the printing of a three-dimensional model, the apparatus comprising:
- a roller rotatable about a longitudinal axis, the roller being operative to make contact with the deposited interface layers;
- a sensing device embedded within the roller operative to detect the contact of the roller with the interface layers; and
- a processor for processing the output from said sensing device.

18. The system according to claim 17, wherein the output from said sensing device is indicative of the height and width of interface material protruding above a predetermined level.

19. The apparatus of claim 17, comprising a device to provide a signal to audibly indicate contact with the interface layers.

20. An apparatus for controlling the finished height of layers deposited during the printing of a three-dimensional model, the layers comprising photopolymer material, the apparatus comprising:
- a roller, the roller to make contact with the deposited layer and remove surplus material from each layer such that the dispensed layer is leveled to a predetermined height: and a device to provide a signal to indicate contact with the material.

21. The apparatus of claim 20, wherein the device is embedded within the roller.

22. The apparatus of claim 20, wherein the signal indicating contact with the material is audible.

* * * * *